United States Patent [19]

Ishibashi et al.

[11] Patent Number: 4,460,191

[45] Date of Patent: Jul. 17, 1984

[54] FOLDABLE BICYCLE FRAME

[75] Inventors: Hideyuki Ishibashi, Ageo; Kikuzo Takamiya, Kitamoto, both of Japan

[73] Assignee: Bridgestone Cycle Co., Ltd., Tokyo, Japan

[21] Appl. No.: 378,291

[22] Filed: May 14, 1982

[51] Int. Cl.$^3$ .............................................. B62K 15/00
[52] U.S. Cl. .................................... 280/287; 280/278; 280/639
[58] Field of Search ................... 280/287, 281 R, 278, 280/638, 639, 38, 39, 40, 642, 643, 645, 646, 42

[56] References Cited

U.S. PATENT DOCUMENTS 4,026,573  5/1977  Richardson ........................ 280/278

FOREIGN PATENT DOCUMENTS 927215   4/1947  France .............................. 280/287
369574   3/1939  Italy ................................. 280/287
442965  12/1948  Italy ................................. 280/287

Primary Examiner—Joseph F. Peters, Jr.
Assistant Examiner—Mitchell J. Hill
Attorney, Agent, or Firm—Jordan and Hamburg

[57] ABSTRACT

A foldable bicycle frame includes a lower frame and a front frame pivotally mounted on the lower frame, the lower frame having fork elements supporting a rear wheel axle. A seat tube is pivotally mounted on the lower frame. A front support stay is pivotally mounted on the front frame and is also pivotally mounted on the seat tube. A seat stay has an upper section and a lower section, the upper section being pivotally connected to the seat tube, the lower section being pivotally connected to the lower frame at the fork elements, the upper and lower sections each having a pair of upper and lower stay members respectively and a locking plate device connecting the upper and lower sections and operable to selectively provide a pivotal connection between the upper and lower sections to provide for folding of the bicycle and to effect a rigid connection between the upper and lower sections to provide assembled operability of the bicycle frame.

8 Claims, 7 Drawing Figures

FOLDABLE BICYCLE FRAME

BACKGROUND OF THE INVENTION

The present invention relates to a foldable bicycle frame capable of being assembled instantaneously for use and folded easily and simply to facilitate storing when the bicycle is not used.

In conventional foldable bicycles, the folding and assembling are generally difficult and require specific tools and troublesome operations for rotating levers many times and so forth, resulting in it being impractical. In addition, it takes a considerable time to fold the bicycle when the bicycle is not used.

Accordingly, an object of the invention is to provide a foldable bicycle frame having a rigid construction and capable of being easily and promptly folded or assembled.

The invention will be described hereinunder in more detail with reference to the accompanying drawings.

DESCRIPTION OF THE PREFERRED EMBODIMENTS

Figure 1:
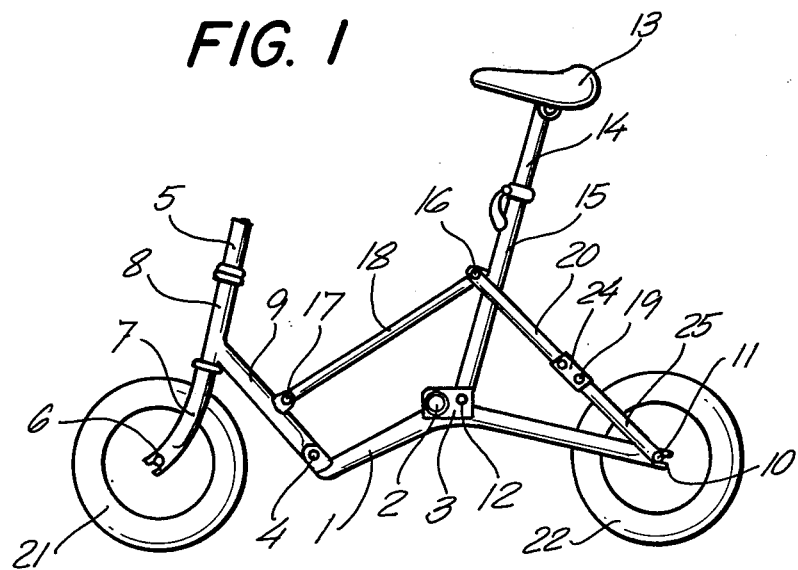
FIG. 1 is a side elevational view of a bicycle according to one embodiment of the invention.

A hanger bracket 3 having a hanger portion 2 is provided on the mid portion of a lower frame 1. A front frame 9 formed integrally with a head pipe 8 is rotatably supported by a shaft 4 attached to the front end of the frame 1. Forks 10 provided at the rear end of the lower frame 1 support a rear wheel axle 11. A shaft attached to the hanger bracket 3 rotatably supports a seat tube 15. A front supply stay 18 is rotatably supported between a shaft 16 attached to the seat tube 15 and a shaft 17 attached to the front frame 9. A seat stay is divided into an upper seat stay 20 and a lower seat stay 25 so as to be able to be pivoted at its mid portion. Each of the upper and lower seat stays is constituted by a pair of members. The outer end of the upper seat stay 20 is pivotally secured to a portion of the seat tube 15 near the upper end of the latter, while the lower seat stay 25 is pivotally secured to the forks 10 provided at the rear end of the lower frame 1. The inner ends of the upper seat stay 20 and the lower seat stay 25 are connected to each other by means of a locking plate 24. More specifically, the inner end of the lower seat stay 25 is fixed to the locking plate 24, while the inner end of the upper seat stay 20 is rotatably and slidably secured by means of a connecting shaft 23 inserted through the locking plate 24. A compression spring 26 acts on the connecting shaft 23 so as to urge the two members of the upper seat stay 20 apart. The connecting ends of the upper seat stay 20 are fittingly supported by gripping portions 27 provided at both sides of the locking plate 24. The locking plate 24 is provided with a stop member or stopper 28 which prevents excessive sliding movement of the members of the upper seat stay 20 when the members are pressed toward each other in overcoming the force of the compression spring 26.

Figure 4:
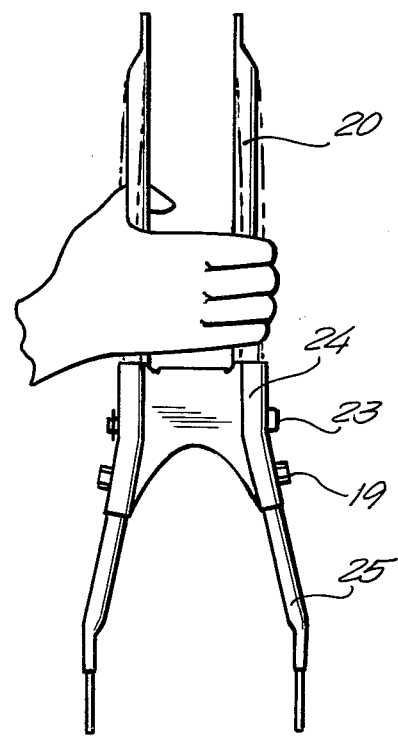
FIG. 4 is a partial view of the embodiment of FIG. 1, showing the upper seat stay being disengaged from the gripping portions of the locking plate by the gripping action of a hand.
Figure 5:
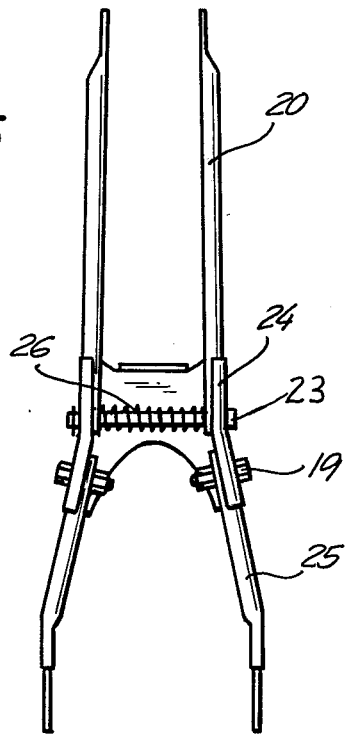
FIG. 5 is a bottom view of a seat stay and the locking plate.
Figure 6:
FIG. 6 is a an end view of the locking plate.
Figure 7:
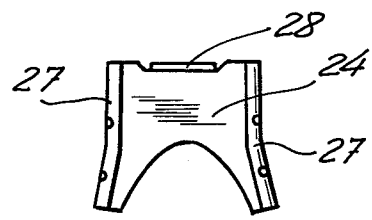
FIG. 7 is a bottom view of the locking plate.

The folding and assembling of the foldable bicycle frame are effected in the following manner. Both members of the upper seat stay 20 fitting in the gripping portions 27 of the locking plate 24 by the action of the compression spring 26 and opposing each other are gripped by one hand as shown in FIG. 4, so that both members of the upper seat stay are slid inwardly, overcoming the force of the compression spring 26, into contact with the stopper 28 of the locking plate 24. The connecting ends of the upper seat stay then come out from the gripping portions 27 of the locking plate 24, so that the upper seat stay 20 is then able to rotate around the connecting shaft 23.

The outer end of the upper seat stay 20 is pivotally secured to the portion of the seat tube 15 near the upper end of the latter, while the lower end of the seat tube 15 is pivotally secured to the hanger bracket 3. The lower seat stay 25 is also pivotally secured to the forks 10 of the lower frame 1. Thus, the lower frame 1, front stay 18, upper seat stay 20 and the lower seat stay 25, in combination, constitute a quadrilateral link. As the upper seat stay 20 is rotated in the direction of arrow A in FIG. 2, the lower seat stay 25 and the seat tube 15 are rotated in the directions of arrows B and C, respectively, so that the frame is folded in such a manner that the seat tube 15 is inclined rearwardly until it comes into contact with the rear wheel axle 22.

Figure 2:
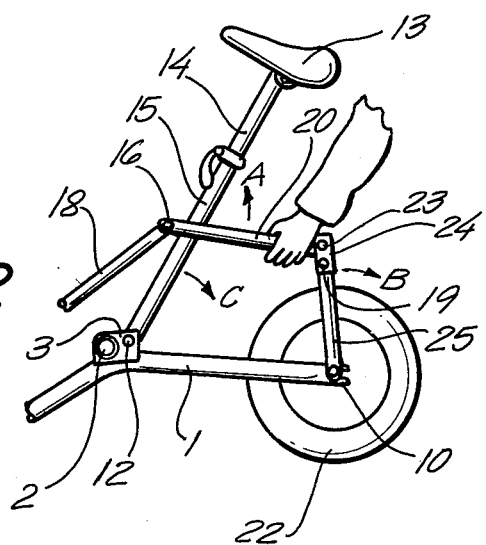
FIG. 2 shows a portion of the embodiment of FIG. 1 during folding.
Figure 3:
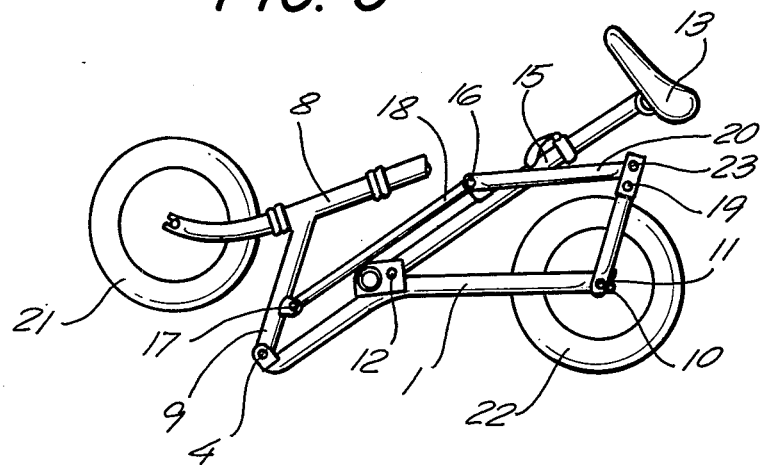
FIG. 3 shows the embodiment shown in FIG. 1 after folding.

To the contrary, when the frame is assembled from the folded state, the upper seat stay 20, the lower seat stay 25 and the seat tube 15 are rotated in a direction opposite to the arrows in FIG. 2, until the upper and lower seat stays 20 and 25 form a substantially straight line. Since the connecting ends of the member of the upper seat stay 20 are spread apart by the force of the compression spring 26, the connecting ends engage the gripping portions 27 of the locking plate 24, thus completing the assembling.

As has been described, according to the invention, all of the constituents of the frame are formed of metallic materials having a high mechanical strength and, hence, a high reliability, and can be folded and assembled easily and instantaneously without requiring any specific tools.

Namely, the folding and assembling can be made by a simple and single action of lifting and depression of the upper seat stay 20.

In addition, any excessive bending at the juncture between the upper seat stay 20 and the seat tube 15 is effectively prevented by the action of the stopper 28 to ensure a stable folding and assembling operation.

We claim:

1. A foldable bicycle frame comprising a lower frame means, a front frame means pivotally mounted on said lower frame means, said lower frame means having fork elements supporting a rear wheel axle, a seat tube pivotally mounted on said lower frame means, a front support stay pivotally mounted on said front frame means and also pivotally mounted on said seat tube, a seat stay having an upper section and a lower section, said upper section being pivotally connected to said seat tube, said lower section being pivotally connected to said lower frame means at said fork elements, said upper and lower sections each comprising a pair of upper and lower stay members respectively, and locking plate means connecting said upper and lower sections and operable to selectively provide a pivotal connection between said upper and lower sections to provide for folding of the bicycle and to effect a rigid connection between said upper and lower sections to provide assembled operability of the bicycle frame, said locking plate means comprising a locking plate element having engaging portions engaging said pair of upper stay members to effect said rigid connection, said locking plate means further comprising a shaft element pivotally mounting said pair of upper stay members to said locking plate element, and biasing means on said shaft element biasing said upper stay members into engagement with said engaging portions of said locking plate.

2. A foldable bicycle frame according to claim 1 further comprising a seat mounted on said seat tube.

3. A foldable bicycle frame according to claim 1 wherein said pair of upper stay members are contructed and arranged to be manually compressed and moved toward each other to overcome the bias of said biasing means and thereby release said pair of upper stay members from engagement with said engaging portions of said locking plate, whereby said pair of upper stay members are thereby free to pivot about said shaft element.

4. A foldable bicycle frame according to claim 1 wherein said locking plate element has a stop member for limiting the extent of pivotal movement of said upper stay members.

5. A foldable bicycle frame according to claim 1 further comprising fastening means fastening said lower stay elements to said locking plate element.

6. A foldable bicycle frame according to claim 1 wherein said lower frame means comprises a lower frame structure having a hanger bracket, said seat tube being pivotally mounted on said hanger bracket.

7. A foldable bicycle frame according to calim 1 wherein said front frame means has a head pipe adapted to mount handle bars.

8. A foldable bicycle frame comprising a lower frame means, a front frame means pivotally mounted on said lower frame means, said lower frame means having fork elements supporting a rear wheel axle, a seat tube pivotally mounted on said lower frame means, a front support stay pivotally mounted on said front frame means and also pivotally mounted on said seat tube, a seat stay having an upper section and a lower section, said upper section being pivotally connected to said seat tube, said lower section being pivotally connected to said lower frame means at said fork elements, said upper and lower sections each comprising a pair of upper and lower stay members respectively, and locking plate means connecting said upper and lower sections and operable to selectively provide a pivotal connection between said upper and lower sections to provide for folding of the bicycle and to effect a rigid connection between said upper and lower sections to provide assembled operability of the bicycle frame, said locking plate means comprising a locking plate element having engaging portions engaging said pair of upper stay members to effect said rigid connection, said engaging portions comprising opposed generally U-shaped sections on said locking plate element.

* * * * *